US011620513B2

(12) United States Patent
Ross et al.

(10) Patent No.: US 11,620,513 B2
(45) Date of Patent: Apr. 4, 2023

(54) COMPUTING CONVOLUTIONS USING A NEURAL NETWORK PROCESSOR

(71) Applicant: Google LLC, Mountain View, CA (US)

(72) Inventors: Jonathan Ross, Mountain View, CA (US); Andrew Everett Phelps, Middleton, WI (US)

(73) Assignee: Google LLC, Mountain View, CA (US)

(*) Notice: Subject to any disclaimer, the term of this patent is extended or adjusted under 35 U.S.C. 154(b) by 636 days.

(21) Appl. No.: 16/593,321

(22) Filed: Oct. 4, 2019

(65) Prior Publication Data
US 2020/0111003 A1 Apr. 9, 2020

Related U.S. Application Data

(63) Continuation of application No. 14/844,738, filed on Sep. 3, 2015, now Pat. No. 10,438,117.
(Continued)

(51) Int. Cl.
*G06N 3/08* (2006.01)
*G06N 3/063* (2023.01)
(Continued)

(52) U.S. Cl.
CPC .............. *G06N 3/08* (2013.01); *G06N 3/0454* (2013.01); *G06N 3/063* (2013.01); *G06N 5/04* (2013.01); *G06N 3/02* (2013.01); *G06N 3/04* (2013.01)

(58) Field of Classification Search
None
See application file for complete search history.

(56) References Cited

U.S. PATENT DOCUMENTS

| 5,014,235 A | 5/1991 | Morton |
| 5,136,717 A | 8/1992 | Morley et al. |

(Continued)

FOREIGN PATENT DOCUMENTS

| CN | 104035751 | 9/2014 |
| EP | 0422348 | 4/1991 |

(Continued)

OTHER PUBLICATIONS

Hu, et al., Deep Convolutional Neural Networks for Hyperspectral Image Classification, Journal of Sensors, vol. 2015, Article ID 258619, 2015, pp. 1-13 (Year: 2015).*
(Continued)

*Primary Examiner* — Wilbert L Starks
(74) *Attorney, Agent, or Firm* — Lerner, David, Littenberg, Krumholz & Mentlik, LLP

(57) ABSTRACT

Methods, systems, and apparatus, including computer programs encoded on computer storage media, for computing a layer output for a convolutional neural network layer, the method comprising: receiving the layer input, the layer input comprising a plurality of activation inputs, the plurality of activation inputs represented as a multi-dimensional matrix comprising a plurality of depth levels, each depth level being a respective matrix of distinct activation inputs from the plurality of activation inputs; sending each respective kernel matrix structure to a distinct cell along a first dimension of the systolic array; for each depth level, sending the respective matrix of distinct activation inputs to a distinct cell along a second dimension of the systolic array; causing the systolic array to generate an accumulated output from the respective matrices sent to the cells; and generating the layer output from the accumulated output.

20 Claims, 9 Drawing Sheets

Related U.S. Application Data

(60) Provisional application No. 62/164,902, filed on May 21, 2015.

(51) Int. Cl.
  G06N 3/04   (2023.01)
  G06N 5/04   (2023.01)
  G06N 3/02   (2006.01)

(56) References Cited

U.S. PATENT DOCUMENTS

| | | |
|---|---|---|
| 5,138,695 A | 8/1992 | Means |
| 5,146,543 A | 9/1992 | Vassiliadis et al. |
| 5,337,395 A | 8/1994 | Vassiliadis et al. |
| 5,471,627 A | 11/1995 | Means et al. |
| 5,544,336 A | 8/1996 | Kato |
| 5,799,134 A | 8/1998 | Chiueh et al. |
| 5,812,993 A | 9/1998 | Ginosar et al. |
| 6,038,337 A | 3/2000 | Lawrence |
| 6,184,753 B1 | 2/2001 | Ishimi |
| 7,136,710 B1 | 11/2006 | Hoffberg |
| 8,184,696 B1 | 5/2012 | Chirila-Rus |
| 8,468,109 B2 | 6/2013 | Moussa et al. |
| 8,924,455 B1 | 12/2014 | Barman et al. |
| 2005/0044053 A1 | 2/2005 | Moreno |
| 2007/0022063 A1 | 1/2007 | Lightowler |
| 2007/0086655 A1 | 4/2007 | Simard et al. |
| 2008/0319933 A1 | 12/2008 | Moussa |
| 2011/0029471 A1 | 2/2011 | Chakradhar et al. |
| 2014/0142929 A1 | 5/2014 | Seide et al. |
| 2014/0180989 A1 | 6/2014 | Krizhevsky et al. |
| 2014/0288928 A1 | 9/2014 | Penn et al. |
| 2014/0337262 A1 | 11/2014 | Kato et al. |
| 2016/0267111 A1 | 9/2016 | Shoaib et al. |

FOREIGN PATENT DOCUMENTS

| | | |
|---|---|---|
| EP | 3064130 | 9/2016 |
| TW | 201232429 | 8/2012 |
| TW | 201331855 | 8/2013 |

OTHER PUBLICATIONS

Huang, et al., An Analysis of Convolutional Neural Networks for Speech Recognition, 2015 IEEE International Conference on Acoustics, Speech and Signal Processing (ICASSP), pp. 4989-4993 (Year: 2015).*
Theano Development Team, Deep Learning Tutorial: Release 0.1, LISA lab, University of Montreal, 2014, pp. 1-153 (Year: 2014).*
AHM Shapri and N.A.Z Rahman. "Performance Analysis of Two-Dimensional Systolic Array Matrix Multiplication with Orthogonal Interconnections," International Journal on New Computer Architectures and Their Applications, 1(3), 2001, pp. 1090-1000.
Beamer et al., "Ivy Bridge Server Graph Processing Bottlenecks," The First International Workshop Computer Architecture for Machine Learning, Jun. 2015, 56 pages.
Bo et al., "String Kernel Testing Acceleration Using Micron's Automata Processor," The First International Workshop Computer Architecture for Machine Learning, Jun. 2015, 21 pages.
Carlo et al., "An Area-Efficient 2-D Convolution Implementation on FPGA for Space Applications," IEEE Computer Society, Dec. 11, 2011, pp. 1-7.
Chen and Li, "Hardware Acceleration for Neuromorphic Computing—An Evolving View," The First International Workshop Computer Architecture for Machine Learning, Jun. 2015, 38 pages.
Chillet et al., "A Neural Network Model for Real-Time Scheduling on Heterogeneous SoC Architectures," Proceedings of International Joint Conference on Neural Networks, Aug. 2007, pp. 102-107.
Cornu et al., "Design, Implementation, and Test of a Multi-Model Systolic Neural-Network Accelerator," Scientific Programming—Parallel Computing Projects of the Swiss Priority Programme, vol. 5, No. 1, Jan. 1, 1996, pp. 47-61, XP055294242.
Dawwd, "The multi 2D systolic design and implementation of Convolutional Neural Networks," 2013 IEEE 20th International Conference on Electronics, Circuits, and Systems (ICECS), IEEE, Dec. 8, 2013, pp. 221-224, XP032595248.
Dielman, Sander, Kyle W. Willett, and Joni Dambre. "Rotation-invariant convolutional neural networks for galaxy morphology prediction," Monthly notices of the royal astronomical society, 450.2, 2015, pp. 1441-1459.
Farabet et al., "Hardware Accelerated Convolutional Neural Networks for Synthetic Vision Systems," Circuits and Systems (ISCAS), Proceedings of 2010 IEEE International Symposium on, May-Jun. 2010, pp. 257-260.
Ginosar, "Accelerators for Machine Learning of Big Data," The First International Workshop Computer Architecture for Machine Learning, Jun. 2015, 13 pages.
Gokhale, "Enabling Machines to Understand our World," The First International Workshop Computer Architecture for Machine Learning, Jun. 2015, 18 pages.
Graf et al., "A Massively Parallel Digital Learning Processor," Proceedings of the 22nd annual conference on Neural Information Processing Systems (NIPS), Dec. 2008, 8 pages, XP055016863.
Hecht et al., "An advanced programmable 2D-convolution chip for, real time image processing," Signal Image and Video Processing, Jun. 1991; [Proceedings of the International Symposium on Circuits and Systems], vol. SYMP, 24, Jun. 11, 1991, pp. 1897-1900, XP010046404.
Indiveri, "Neuromorphic circuits for building autonomous cognitive systems," The First International Workshop Computer Architecture for Machine Learning, Jun. 2015, 37 pages.
International Preliminary Report on Patentability issued in International Application No. PCT/US2016/029968, dated Nov. 30, 2017, 8 pages.
International Search Report and Written Opinion in International Application No. PCT/US2016/030515, dated Aug. 25, 2016, 19 pages.
International Search Report and Written Opinion in International Application No. PCT/US2016/030536, dated Aug. 31, 2016, 17 pages.
International Search Report and Written Opinion in International Application No. PCT/US2016/029968, dated Sep. 1, 2016, 14 pages.
International Search Report and Written Opinion in International Application No. PCT/US2016/029294, dated Sep. 1, 2016, 13 pages.
International Search Report and Written Opinion in International Application No. PCT/US2016/029986, dated Sep. 1, 2016, 13 pages.
International Search Report and Written Opinion in International Application No. PCT/US2016/029965, dated Sep. 1, 2016, 13 pages.
Kane, "An instruction systolic array architecture for multiple neural network types," Loughborough University, Doctoral Thesis, Sep. 1998, 315 pages.
Khan and Ling, "Systolic architectures for artificial neural nets," Neural Networks, 1991. 1991 IEEE International Joint Conference on, vol. 1, Nov. 1991, pp. 620-627.
Kim et al. "Efficient Hardware Architecture for Sparse Coding," IEEE Transactions on Signal Processing 62.16, Aug. 15, 2014, 14 pages.
Kim et al., "A Large-Scale Architecture for Restricted Boltzmann Machines," Field-Programmable Custom Computing Machines (FCCM), 2010 18th IEEE Annual International Symposium on, IEEE, May 2, 2010, pp. 201-208, XP031681940.
Krizhevsky et al., "ImageNet classification with deep convolutional neural networks," The 26th annual conference on Neural Information Processing Systems (NIPS'25), Dec. 2012, pp. 1-9, XP55113686.
Kung et al., "Two-level pipelined systolic array for multidimensional convolution," Image and Vision Computing, Elsevier, vol. 1, No. 1, Feb. 2, 1983, pp. 30-36, XP024237511.
Kung, "VLSI Array Processors," IEEE ASSP Magazine, IEEE, vol. 2, No. 3, Jul. 1, 1985, pp. 4-22, XP011370547.

(56) References Cited

OTHER PUBLICATIONS

Lee and Song, "Implementation of the Super-Systolic Array for Convolution," Design Automation Conference, 2003. Proceedings of the ASP-DAC 2003. Asia and South Pacific, Jan. 2003, pp. 491-494.

Lee, Yim-Kul, and William T. Rhodes. "Nonlinear image processing by a rotating kernel transformation," Optics letters 15.23, 1990, pp. 1383-1385.

Lehmann et al., "A generic systolic array building block for neural networks with on-chip learning," Neural Networks, IEEE Transactions on, 4(3):400-407, May 1993.

Lipasti et al., Mimicking the Self-Organizing Properties of the Visual Cortex, The First International Workshop Computer Architecture for Machine Learning, Jun. 2015, 23 pages.

Lo, Shih-Chung B., et al. "Artificial convolutional neural network for medical image pattern recognition," Neural networks 8.7, 1995, pp. 1201-1214.

Mahapatra et al., "Mapping of Neural Network Models onto Systolic Arrays," Journal of Parallel and Distributed Computing 60, 677-689, Jan. 2000.

Merolla et al. "A digital Neurosynaptic Core Using Embedded Crossbar Memory with 45pJ per Spike in 45nm," IEEE CICC, Sep. 19, 2011, 4 pages.

Office Action in Taiwanese Application No. 105115859, dated Nov. 16, 2016, 10 pages.

Ovtcharov et al., "Accelerating Deep Convolutional Neural Networks Using Specialized Hardware in the Datacenter," The First International Workshop Computer Architecture for Machine Learning, Jun. 2015, 33 pages.

Patil et al., "Hardware Architecture for Large Parallel Array of Random Feature Extractors applied to Image Recognition," Dec. 24, 2015, arXiv:1512,07783vl, 18 pages, XP055296121.

Pearce, "You Have No (Predictive) Power Here, SPEC!" The First International Workshop Computer Architecture for Machine Learning, Jun. 2015, 15 pages.

Rojas, "Hardware for Neural Networks," Neural Networks, Springer-Verlag, Berlin, 1996, pp. 451-478.

Shaaban, "Systolic Architectures," PowerPoint Presentation, Mar. 2003, 9 pages.

Shapri and Rahman, "Performance Analysis of Two-Dimensional Systolic Array Matrix Multiplication with Orthogonal Interconnections," International Journal on New Computer Architectures and Their Applications (IJNCAA) 1(3):1066-1075, Dec. 2011.

Smith, "Biologically Plausible Spiking Neural Networks," The First International Workshop Computer Architecture for Machine Learning, Jun. 2015, 77 pages.

Sudha et al., "Systolic array realization of a neural network-based face recognition system," Industrial Electronics and Applications, 2008, ICIEA 2008, 3rd IEEE Conference on, pp. 1864-1869, Jun. 2009.

Wong et al., "A New Scalable Systolic Array Processor Architecture for Discrete Convolution," College of Engineering at the University of Kentucky, Master Thesis, 2003, 175 pages.

Wu et al., "Flip-Rotate-Pooling Convolution and Split Dropout on Convolution Neural Networks for Image Classification," Jul. 31, 2015, arXiv:1507.08754vl, pp. 1-9, XP055296122.

Yiping et al. "A High Performance Digital Neural Processor Design by Network on Chip Architecture" IEEE VLSI Design, Automation and Test, Apr. 25, 2011, 4 pages.

Zhang, et al., Optimizing FPGA-based Accelerator Design for Deep Convolutional Neural Networks, FPGA '15 Proceedings of the 2015 ACM/SIGDA International Symposium on Field-Programmable Gate Arrays, pp. 161-170 (Year: 2015).

Ovtcharov et al., "Accelerating Deep Convolutional Neural Networks Using Specialized Hardware," Microsoft Research, [online] [retrieved Mar. 25, 2021]. Retrieved from the Internet: <URL:http://www.microsoft.com/en-us/research/wp-content/uploads/2016/02/CNN20Whitepaper.pdf>, Feb. 22, 2015, 4 pages.

\* cited by examiner

COMPUTING CONVOLUTIONS USING A NEURAL NETWORK PROCESSOR

CROSS REFERENCE TO RELATED APPLICATIONS

This application is a continuation of U.S. patent application Ser. No. 14/844,738, filed Sep. 3, 2015, now allowed, which is a non-provisional of and claims priority from U.S. Provisional Patent Application No. 62/164,902, filed May 21, 2015. The entire contents of the prior applications are hereby incorporated by reference in their entirety.

BACKGROUND

This specification relates to computing neural network inferences in hardware.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

Some existing systems perform computations for a given convolutional layer in software. For example, the software can apply each kernel for the layer to the set of activation inputs. That is, for each kernel, the software can overlay the kernel, which can be represented multi-dimensionally, over a first portion of activation inputs, which can be represented multi-dimensionally. The software can then compute a dot product from the overlapped elements. The dot product can correspond to a single activation input, e.g., an activation input element that has an upper-left position in the overlapped multi-dimensional space. For example, using a sliding window, the software then can shift the kernel to overlay a second portion of activation inputs and calculate another dot product corresponding to another activation input. The software can repeatedly perform this process until each activation input has a corresponding dot product. In some implementations, the dot products are input to an activation function, which generates activation values. The activation values can be combined, e.g., pooled, before being sent to a subsequent layer of the neural network.

One way of computing convolution calculations requires numerous matrix multiplications in a large dimensional space. A processor can compute matrix multiplications through a brute force method. For example, although compute-intensive and time-intensive, the processor can repeatedly calculate individual sums and products for convolution calculations. The degree to which the processor parallelizes calculations is limited due to its architecture.

SUMMARY

In general, this specification describes a special-purpose hardware circuit that computes neural network inferences.

In general, one innovative aspect of the subject matter described in this specification can be embodied in methods that include the actions of computing a layer output for a convolutional neural network layer from a layer input using a two-dimensional systolic array, the convolutional neural network layer having a plurality of kernels, each kernel having a respective matrix structure of weights, the method comprising: receiving the layer input, the layer input comprising a plurality of activation inputs, the plurality of activation inputs represented as a multi-dimensional matrix comprising a plurality of depth levels, each depth level being a respective matrix of distinct activation inputs from the plurality of activation inputs; sending each respective kernel matrix structure to a distinct cell along a first dimension of the systolic array; for each depth level, sending the respective matrix of distinct activation inputs to a distinct cell along a second dimension of the systolic array; causing the systolic array to generate an accumulated output from the respective matrices sent to the cells; and generating the layer output from the accumulated output.

Implementations can include one or more of the following features. The first dimension of the systolic array corresponds to columns of the systolic array, and where the second dimension of the systolic array corresponds to rows of the systolic array. Determining that a count of the plurality of activation inputs is less than a size of the second dimension of the systolic array; sending one or more duplicate matrices of distinct activation inputs to unused cells along the second dimension of the systolic array. Determining that a count of the plurality of kernels is less than a size of the first dimension of the systolic array; sending one or more duplicate kernel matrix structures to unused cells along the first dimension of the systolic array. A stride parameter for the convolutional neural network is greater than one, the method further comprising: remapping, for each kernel structure, weights in the respective matrix to cause the matrix to have an increased number of depth levels. Generating the layer output from the accumulated output comprises normalizing and pooling the accumulated output to generate the layer output. Sending each respective kernel matrix structure to a distinct cell along a first dimension of the systolic array comprises: at a given clock cycle, storing a first element in the kernel matrix structure in a first cell of the systolic array; and at a subsequent clock cycle, shifting the first element in the first cell to a second cell that is adjacent to the first cell and storing a second element in the kernel matrix structure in the first cell. The systolic array comprises a plurality of cells, where the plurality of weight inputs is shifted through a first plurality of cells along a first dimension of the systolic array, and where the plurality of activation inputs is shifted through a second plurality of cells along a second dimension of the systolic array. Each cell in the plurality of cells comprises: a weight register configured to store a weight input; an activation register configured to store an activation input and configured to send the activation input to another activation register in a first adjacent cell along the second dimension; a sum-in register configured to store a previously summed value; multiplication circuitry coupled to the weight register and the activation register, where the multiplication circuitry is configured to output a product of the weight input and the activation input; and summation circuitry coupled to the multiplication circuitry and the sum-in register, where the summation circuitry is configured to output a sum of the product and the previously summed value, and where the summation circuitry is configured to send the sum to another sum-in register in a second adjacent cell along the first dimension.

Particular embodiments of the subject matter described in this specification can be implemented so as to realize one or more of the following advantages. A neural network processor in hardware can process inferences for neural networks having convolutional layers more efficiently. In particular, the processor can flatten convolutions, which enables computations of multiple convolution calculations with fewer clock cycles. Flattening can be a reshaping of a convolution into one or more matrix multiplies. Convolution flattening also processes a stride parameter of a neural network without requiring additional hardware. Also, the neural network processor manages convolution flattening using control signals, and the processor shifts the control signals through components of the neural network processor, which removes a need to wire the control signals individually to each component. The processor can replicate weight inputs, activation inputs, or both, for use in a convolution calculation, which decreases time spent accessing the inputs from memory and increases a number of convolution calculations performed in parallel, thereby processing layers more efficiently.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network having multiple layers can be used to compute inferences. For example, given an input, the neural network can compute an inference for the input. The neural network computes this inference by processing the input through each of the layers of the neural network. In particular, the layers of the neural network are arranged in a sequence, each with a respective set of weights. Each layer receives an input and processes the input in accordance with the set of weights for the layer to generate an output.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, can be referred to as activation inputs to the layer. Activation inputs can be represented as a matrix structure of activation values. This matrix structure is described further below in reference to FIG. 6.

In some implementations, the layers of the neural network are arranged in a directed graph. That is, any particular layer can receive multiple inputs, multiple outputs, or both. The layers of the neural network can also be arranged such that an output of a layer can be sent back as an input to a previous layer. In some implementations, at least one of the layers of the neural network is a convolutional layer.

Figure 1:
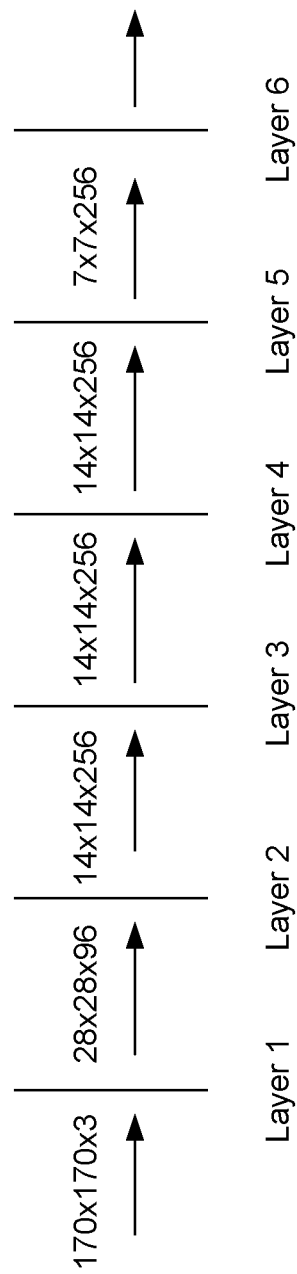
FIG. 1 shows an example neural network having multiple layers.

FIG. 1 shows an example neural network 100 having multiple layers. Each layer can process an input of a particular size and generate an output of another size. By way of illustration, Layer 1 can process a 170×170×3 image and output a 28×28×96 matrix of activation values. The 28×28×96 matrix of activation values is processed by Layers 2-6, and the output of Layer 6 can be used to generate an inference of the neural network. Layers 1-3 can be convolutional layers. These matrices will be described further below in reference to FIG. 6.

As described above, a convolutional neural network layer can have an associated set of kernels. Each kernel includes a set of weight inputs, which when applied to activation inputs of the layer, can cause activation values to be generated, which can be used to generate an output for the layer. In some implementations, applying weight inputs to activation inputs includes performing a dot product of each weight input with a portion of activation inputs.

Computing activation values, e.g., the 28×28×96 matrix of activation values, for a convolutional layer is described further below in reference to FIG. 7.

Figure 2:
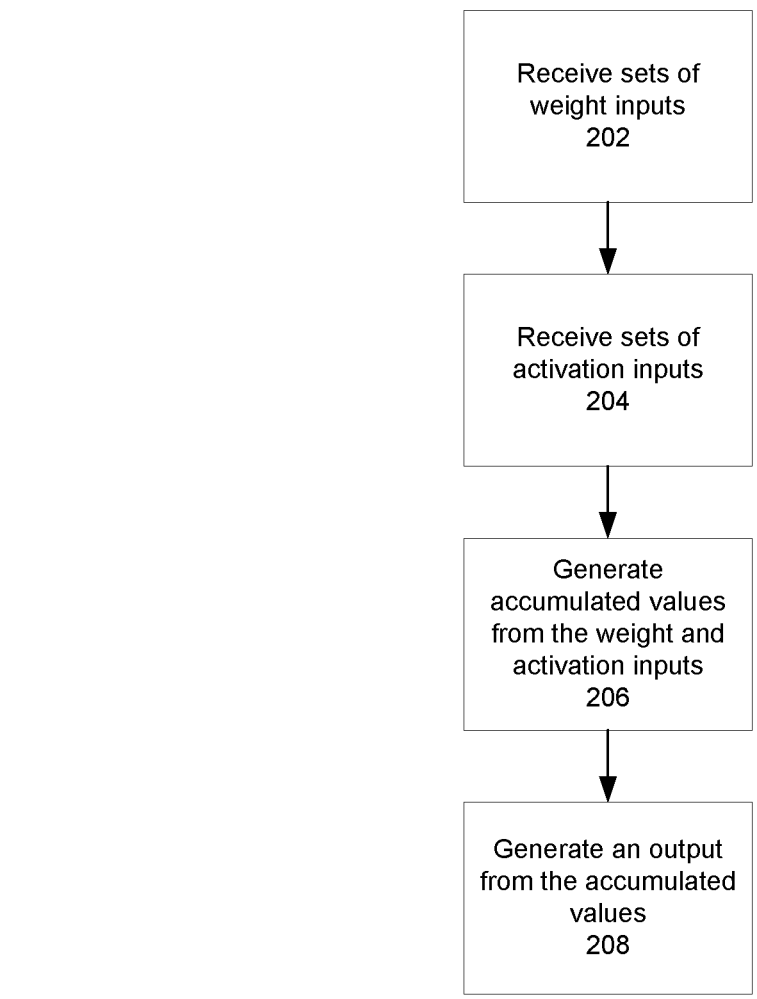
FIG. 2 is a flow diagram of an example method for performing a computation for a given layer of a neural network.

FIG. 2 is a flow diagram of an example process 200 for performing a computation for a given layer of a neural network using a special-purpose hardware circuit. For convenience, the method 200 will be described with respect to a system having one or more circuits that performs the method 200. The process 200 can be performed for each layer of the neural network in order to compute an inference from a received input.

The system receives sets of weight inputs (step 202) and sets of activation inputs (step 204) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 206). In some implementations, the accumulated values are dot products of the sets of weight inputs and the sets of activation inputs. That is, for one set of weights, the system can multiply each weight input with each activation input and sum the products together to form an accumulated value. The system can then compute dot products of other set of weights with other sets of activation inputs. This will be described further below in reference to FIG. 7.

The system can generate a layer output from the accumulation values (step 208) using a vector computation unit of the special-purpose hardware circuit. In some implementations, the vector computation unit applies an activation function to the accumulated values. The output of the layer can be stored in the unified buffer for use as an input to a subsequent layer in the neural network or can be used to determine the inference. The system finishes processing the neural network when a received input has been processed through each layer of the neural network to generate the inference for the received input.

Figure 3:
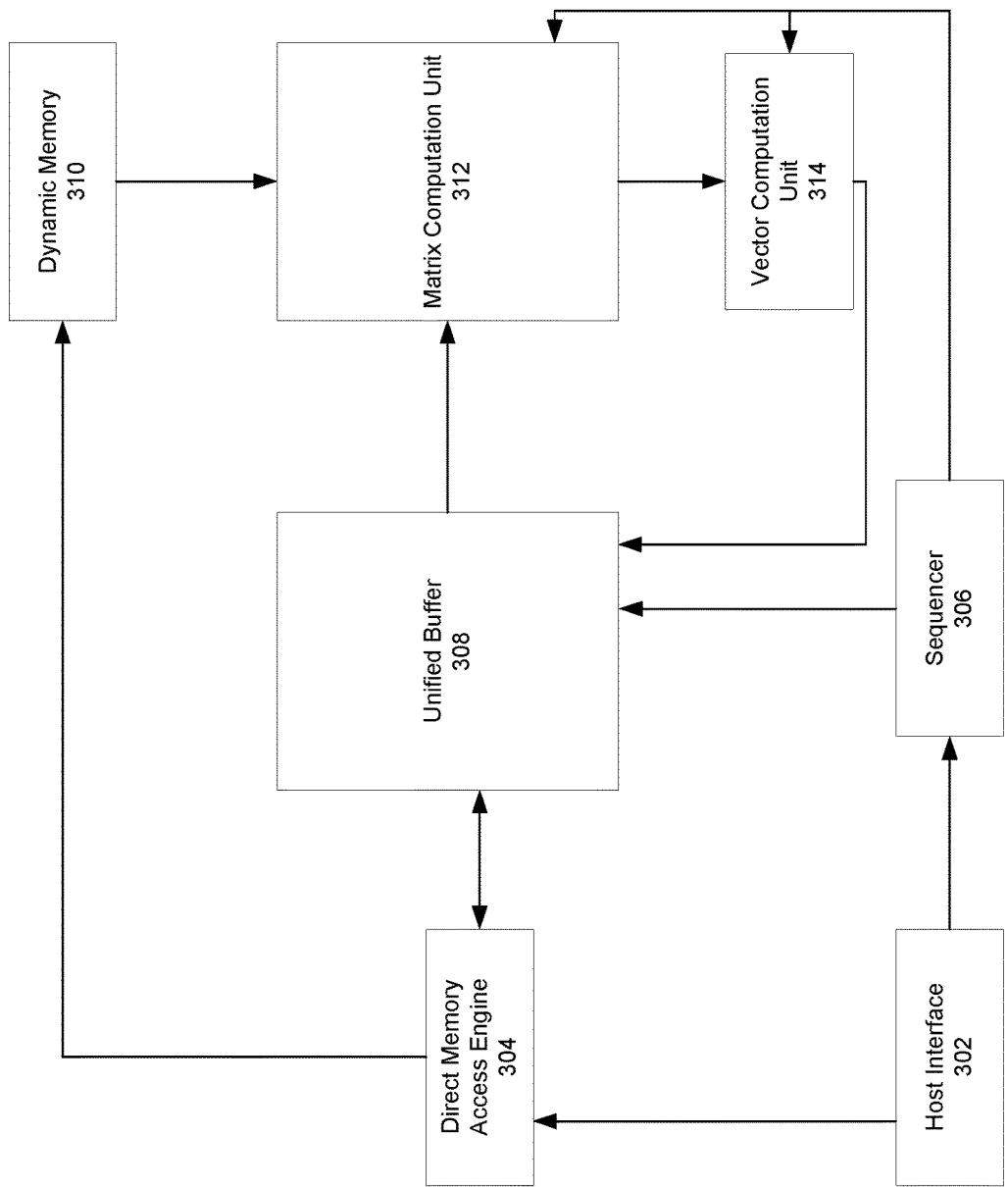
FIG. 3 shows an example neural network processing system.

FIG. 3 shows an example special-purpose integrated circuit 300 for performing neural network computations. The system 300 includes a host interface 302. The host interface 302 can receive instructions that include parameters for a neural network computation. The parameters can include at least one or more of the following: how many layers should be processed, corresponding sets of weight inputs for each layer of the layer, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 302 can send the instructions to a sequencer 306, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 306 can send the control signals to a unified buffer 308, a matrix computation unit 312, and a vector computation unit 314.

In some implementations, the sequencer 306 also sends control signals to a direct memory access engine 304 and dynamic memory 310. In some implementations, the sequencer 306 is a processor that generates clock signals. The sequencer 306 can use timing of the clock signals to, at appropriate times, send the control signals to each component of the circuit 300. In some other implementations, the host interface 302 passes in a clock signal from an external processor.

The host interface 302 can send the sets of weight inputs and the initial set of activation inputs to the direct memory access engine 304. The direct memory access engine 304 can store the sets of activation inputs at the unified buffer 308. In some implementations, the direct memory access stores the sets of weights to dynamic memory 310, which can be a memory unit. In some implementations, the dynamic memory is located off of the circuit.

The unified buffer 308 is a memory buffer. It can be used to store the set of activation inputs from the direct memory access engine 304 and outputs of the vector computation unit 314. The direct memory access engine 304 can also read the outputs of the vector computation unit 314 from the unified buffer 308.

The dynamic memory 310 and the unified buffer 308 can send the sets of weight inputs and the sets of activation inputs, respectively, to the matrix computation unit 312. In some implementations, the matrix computation unit 312 is a two-dimensional systolic array. The matrix computation unit 312 can also be a one-dimensional systolic array or other circuitry that can perform mathematical operations, e.g., multiplication and addition. In some implementations, the matrix computation unit 312 is a general purpose matrix processor. The matrix computation unit 312 will be described in more detail below with reference to FIG. 4 and FIG. 5.

The matrix computation unit 312 can process the weight inputs and the activation inputs and provide a vector of outputs to the vector computation unit 314. In some implementations, the matrix computation unit sends the vector of outputs to the unified buffer 308, which sends the vector of outputs to the vector computation unit 314. The vector computation unit can process the vector of outputs and store a vector of processed outputs to the unified buffer 308. For example, the vector computation unit 314 can apply a non-linear function to outputs of the matrix computation unit, e.g., a vector of accumulated values, to generate activation values. In some implementations, the vector computation unit 314 generates normalized values, pooled values, or both. The vector of processed outputs can be used as activation inputs to the matrix computation unit 312, e.g., for use in a subsequent layer in the neural network.

Figure 4:
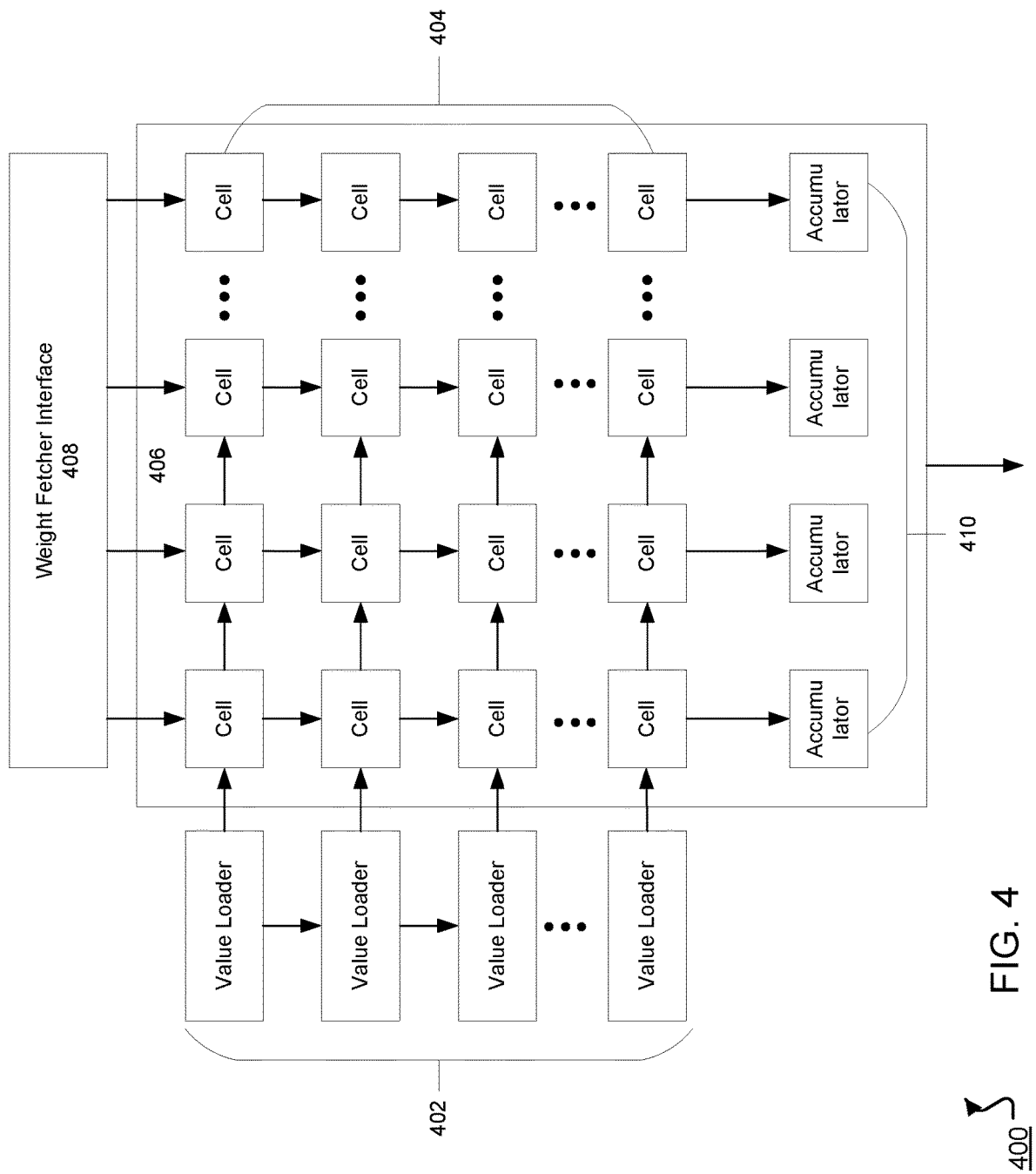
FIG. 4 shows an example architecture including a matrix computation unit.

FIG. 4 shows an example architecture 400 including a matrix computation unit. The matrix computation unit is a two-dimensional systolic array 406. The array 406 includes multiple cells 404. In some implementations, a first dimension 420 of the systolic array 406 corresponds to columns of cells and a second dimension 422 of the systolic array 406 corresponds to rows of cells. The systolic array can have more rows than columns, more columns than rows, or an equal number of columns and rows.

In the illustrated example, value loaders 402 send activation inputs to rows of the array 406 and a weight fetcher interface 408 sends weight inputs to columns of the array 406. In some other implementations, however, activation inputs are transferred to the columns and weight inputs are transferred to the rows of the array 406.

The value loaders 402 can receive the activation inputs from a unified buffer, e.g., the unified buffer 308 of FIG. 3. Each value loader can send a corresponding activation input to a distinct left-most cell of the array 406. The left-most cell can be a cell along a left-most column of the array 406. For example, value loader 412 can send an activation input to cell 414. The value loader can also send the activation input to an adjacent value loader, and the activation input can be used at another left-most cell of the array 406. This allows activation inputs to be shifted for use in another particular cell of the array 406.

The weight fetcher interface 408 can receive the weight input from a memory unit, e.g., the dynamic memory 310 of FIG. 3. The weight fetcher interface 408 can send a corresponding weight input to a distinct top-most cell of the array 406. The top-most cell can be a cell along a top-most row of the array 406. For example, the weight fetcher interface 408 can send weight inputs to cells 414 and 416.

In some implementations, a host interface, e.g., the host interface 302 of FIG. 3, shifts activation inputs throughout the array 406 along one dimension, e.g., to the right, while shifting weight inputs throughout the array 406 along another dimension, e.g., to the bottom. For example, over one clock cycle, the activation input at cell 414 can shift to an activation register in cell 416, which is to the right of cell 414. Similarly, the weight input at cell 416 can shift to a weight register at cell 418, which is below cell 414.

On each clock cycle, each cell can process a given weight input and a given activation input to generate an accumulated output. The accumulated output can also be passed to an adjacent cell along the same dimension as the given weight input. An individual cell is described further below with reference FIG. 5.

The accumulated output can be passed along the same column as the weight input, e.g., towards the bottom of the column in the array 406. In some implementations, at the bottom of each column, the array 406 can include accumulator units 410 that store and accumulate each accumulated output from each column when performing calculations with layers having more weight inputs than columns or layers having more activation inputs than rows. In some implementations, each accumulator unit stores multiple parallel accumulations. The accumulator units 410 can accumulate each accumulated output to generate a final accumulated value. The final accumulated value can be transferred to a vector computation unit, e.g., the vector computation unit 214 of FIG. 2. In some other implementations, the accumulator units 410 passes the accumulated values to the vector computation unit without performing any accumulations when processing layers with fewer weight inputs than columns or layers having fewer activating inputs than rows.

Figure 5:
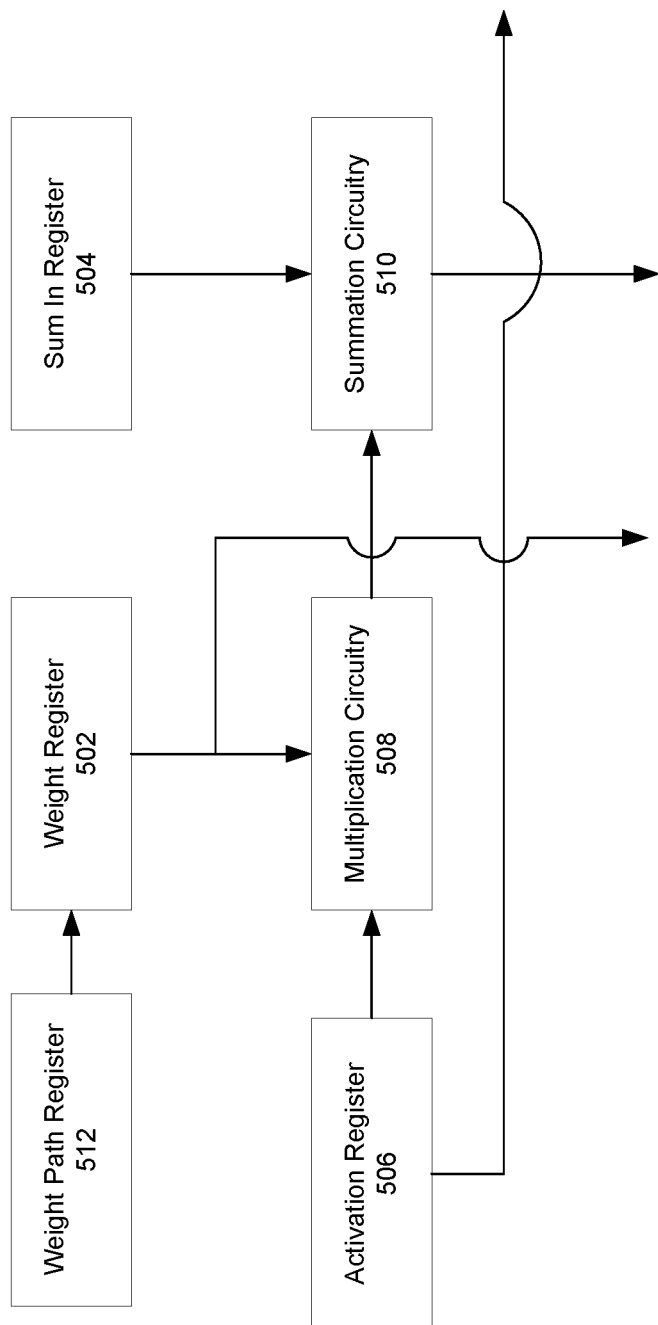
FIG. 5 shows an example architecture of a cell inside a systolic array.

FIG. 5 shows an example architecture 500 of a cell inside a systolic array, e.g., the systolic array 406 of FIG. 4.

The cell can include an activation register 506 that stores an activation input. The activation register can receive the activation input from a left adjacent cell, i.e., an adjacent cell located to the left of the given cell, or from a unified buffer, depending on the position of the cell within the systolic array. The cell can include a weight register 502 that stores a weight input. The weight input can be transferred from a top adjacent cell or from a weight fetcher interface, depending on the position of the cell within the systolic array. The cell can also include a sum in register 504. The sum in register 504 can store an accumulated value from the top adjacent cell. Multiplication circuitry 508 can be used to multiply the weight input from the weight register 502 with the activation input from the activation register 506. The multiplication circuitry 508 can output the product to summation circuitry 510.

The summation circuitry can sum the product and the accumulated value from the sum in register 504 to generate a new accumulated value. The summation circuitry 510 can then send the new accumulated value to another sum in register located in a bottom adjacent cell. The new accumulated value can be used as an operand for a summation in the bottom adjacent cell.

In some implementations, instead of using sum in register 504, the cell uses a sum out register. That is, the sum out register can store an output of the summation circuitry 510 and can pass the output to an adjacent cell. The cell can also shift the weight input and the activation input to adjacent cells for processing. For example, the weight register 502 can send the weight input to another weight register in the bottom adjacent cell. The activation register 506 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 508, or can determine whether the multiplication circuitry 508 operates on the activation and weight inputs. The control signal can also be passed to one or more adjacent cells, e.g., using a wire.

In some implementations, weights are pre-shifted into a weight path register 512. The weight path register 512 can receive the weight input, e.g., from a top adjacent cell, and transfer the weight input to the weight register 502 based on the control signal. The weight register 502 can statically store the weight input such that as activation inputs are transferred to the cell, e.g., through the activation register 506, over multiple clock cycles, the weight input remains within the cell and is not transferred to an adjacent cell. Therefore, the weight input can be applied to multiple activation inputs, e.g., using the multiplication circuitry 508, and respective accumulated values can be transferred to an adjacent cell.

As described above, for a given neural network layer, the systolic array performs the operations for the layer using two-dimensional matrix multiplication.

In order to effectively perform convolution calculations using the systolic array, the neural network processor parallelizes matrix multiplications having large dimensional spaces, which are generally required for convolution calculations. In particular, the neural network processor can "flatten" matrices. By way of illustration, the neural network process can flatten a set of activation inputs. For example, the set of activation inputs can be represented as a 3D matrix. The 3D matrix can be visualized as a stack of 2D matrices. Each 2D matrix can then be sent to a row of the systolic array. Kernels can then be sent to columns of the systolic array, and the systolic array can then use the kernels to perform numerous calculations on each 2D matrix at once, thereby parallelizing a convolution computation. This will be described further below in reference to FIGS. 6-8.

Figure 6:
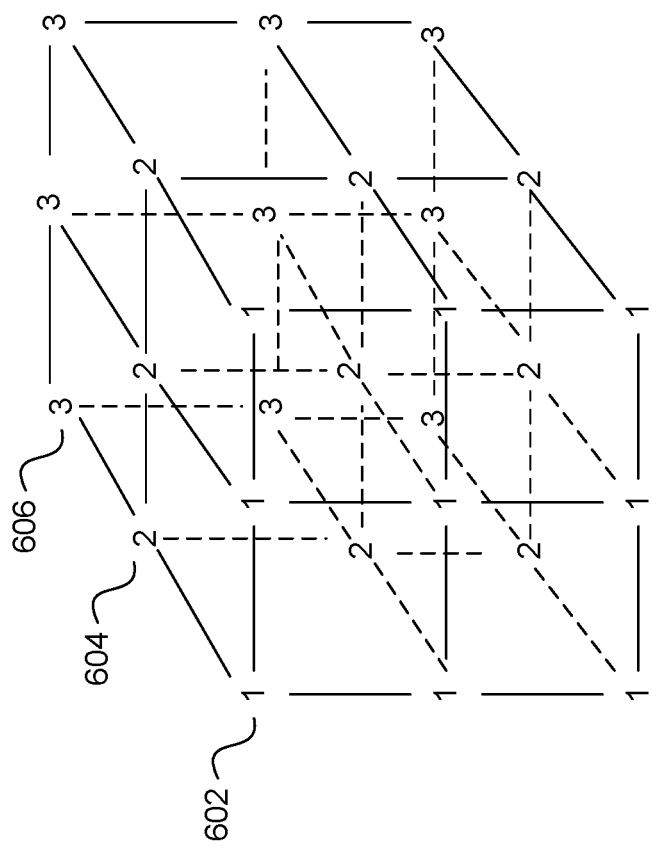
FIG. 6 shows an example matrix structure having spatial dimensions and a feature dimension.

FIG. 6 shows an example matrix structure 600 having spatial dimensions and a feature dimension. The matrix structure 600 can represent either a set of activation inputs or a set of weight inputs. A matrix structure for a set of activation inputs will be referred to in this specification as an activation matrix structure, and a matrix structure for a set of weight inputs will be referred to in this specification as a kernel matrix structure. The matrix structure 600 has three dimensions: two spatial dimensions and one feature dimension.

In some implementations, the spatial dimensions correspond to a space or position of a set of activation inputs. For example, if the neural network is processing an image, which has two dimensions, the matrix structures can have two spatial dimensions, which correspond to spatial coordinates, i.e., XY coordinates, of the image.

The feature dimension corresponds to features from an activation input. Each feature dimension can have depth levels; for example, the matrix structure 600 has depth levels 602, 604, and 606. By way of illustration, if matrix structure 600 represents a 3×3×3 image sent as a set of activation inputs to a first layer, the X and Y dimensions of the image (3×3) can be the spatial dimensions, and the Z dimension (3) can be the feature dimension corresponding to R, G, and B values. That is, depth level 602 can correspond to a feature of nine '1' activation inputs, e.g., red values, depth level 604 can correspond to a feature of nine '2' activation inputs, e.g., green values, and depth level 606 can correspond to a feature of nine '3' activation inputs, e.g., blue values.

Although only three depth levels for the feature dimension are illustrated in the example of FIG. 6, a given feature dimension can have a large number, e.g., hundreds, of feature dimensions. Similarly, although only one feature dimension is illustrated, a given matrix structure can have multiple feature dimensions.

In order to perform the computation for the convolutional layer, using the matrix structure 600, the system has to convert the convolutional computation to a two-dimensional matrix multiplication.

Figure 7:
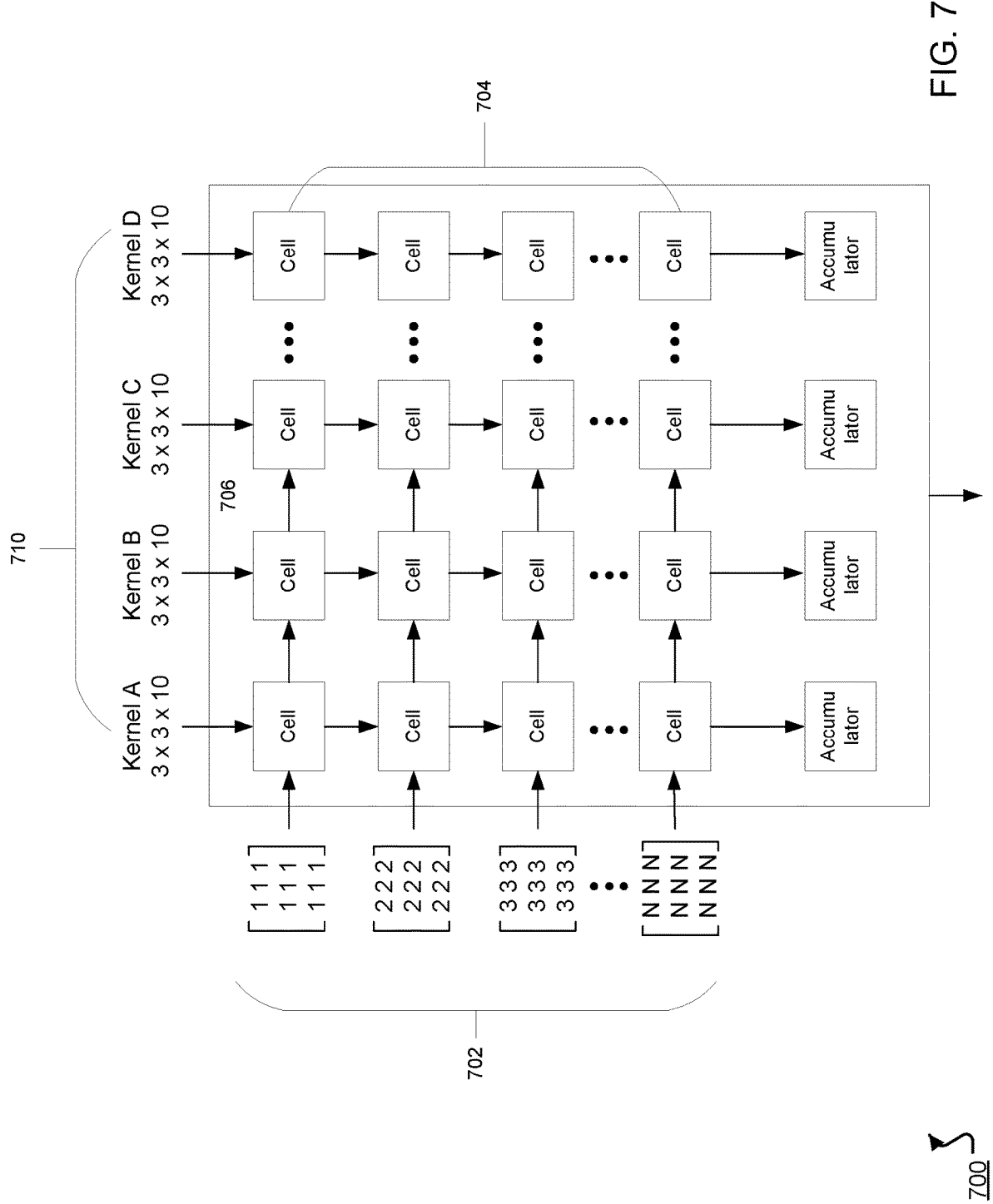
FIG. 7 shows an example illustration of how a kernel matrix structure is sent to a systolic array.

FIG. 7 shows an example illustration of how a matrix structure 600 of FIG. 6 is processed by a systolic array 706 at a given convolutional layer. The matrix structure 600 can be a set of activation inputs. Generally, the neural network processor can send the activation inputs, e.g., elements within matrix structure 600, and weight inputs, e.g., Kernels A-D 710, to rows and columns of the array, respectively. The activation and weight inputs can be shifted to the right and to the bottom, respectively, of the systolic array and must reach a particular position, e.g., a particular register at a particular cell. Once the inputs are determined to be in place, e.g., via control signals, the processor can perform calculations using the inputs stored within the cells to generate the given layer's output.

The neural network processor "flattens" the matrix structure 600 before sending portions of the structure 600 to rows of the systolic array, as described above. That is, the neural network processor can split up the depth layers 702 of the matrix structure 600, e.g., depth layers 602, 604, and 606 of FIG. 6, and send each depth layer to a distinct cell. In some implementations, each depth layer is sent to a cell on a different row of the systolic array 706. For example, the processor can send the activation inputs from a first depth layer, e.g., a matrix of nine '1' activation inputs, to a left-most cell at a first row of the systolic array 706, a second depth layer, e.g., a matrix of nine '2' activation inputs, to a left-most cell at a second row, a third depth layer, e.g., a matrix of nine '3' activation inputs, to a left-most cell at a third row, and so on.

The given layer can have multiple kernels, e.g., Kernels A-D 710. Kernels A-D 710 can have matrix structures of dimension 3×3×10. The processor can send each kernel matrix structure to a cell at a distinct column of the systolic array 706. For example, Kernel A can be sent to a top cell in a first column, Kernel B can be sent to a top cell in a second column, and so on.

When a matrix structure is sent to a cell, a first element of the matrix can be stored in the cell during one clock cycle. On the next clock cycle, a next element can be stored in the cell. The first element stored can be shifted to an adjacent cell, as described above in reference to FIG. 5. The shifting of inputs can continue until all elements of the matrix structure are stored in the systolic array 706. Both activation inputs and weight inputs can be shifted throughout each cell after one or more clock cycles. Shifting of the inputs within the systolic array will be described further below in reference to FIG. 8.

In some implementations, the systolic array 706 has a large number of rows and a large number of columns, e.g., 256 rows and 256 columns. If a given layer of the neural network has fewer sets of weight inputs than columns in the systolic array 706, the processor can replicate one or more matrix structures for the sets of weight kernels and send the replicated matrix structures to unused columns of the array 706. If the given layer has fewer sets of activation inputs than columns in the array, the processor can replicate one or more matrix structures for the sets of activation inputs and send the replicated matrix structures to unused rows of the array 706. By replicating sets of activation inputs or sets of weight inputs, or both, the processor can perform multiple convolution calculations in parallel.

In some implementations, the processor sends a first portion of the matrix structure to a row or column and a second portion of the matrix structure to another row or column. The second portion can overlap with a part of the first portion and be offset by one in an X or Y direction. For example, for a kernel matrix structure having a size of 5×5, the processor can send a first 2×2 portion to a particular column of the systolic array 706. The processor can send a second 2×2 portion to another column. The second portion can be the first portion but shifted by one in the X direction, e.g., to the right. The processor can send the second portion to an unused column of the array. The processor can continue to send portions of the matrix structure to unused columns of the array, and the processor can perform convolution calculations on each portion.

In some implementations, the processor tracks which portions have been sent to which columns the systolic array 706. For example, for each portion sent to a row or column, the processor can store a row or column address and an offset to a read address of the portion of the matrix structure in a unified buffer.

Figure 8:
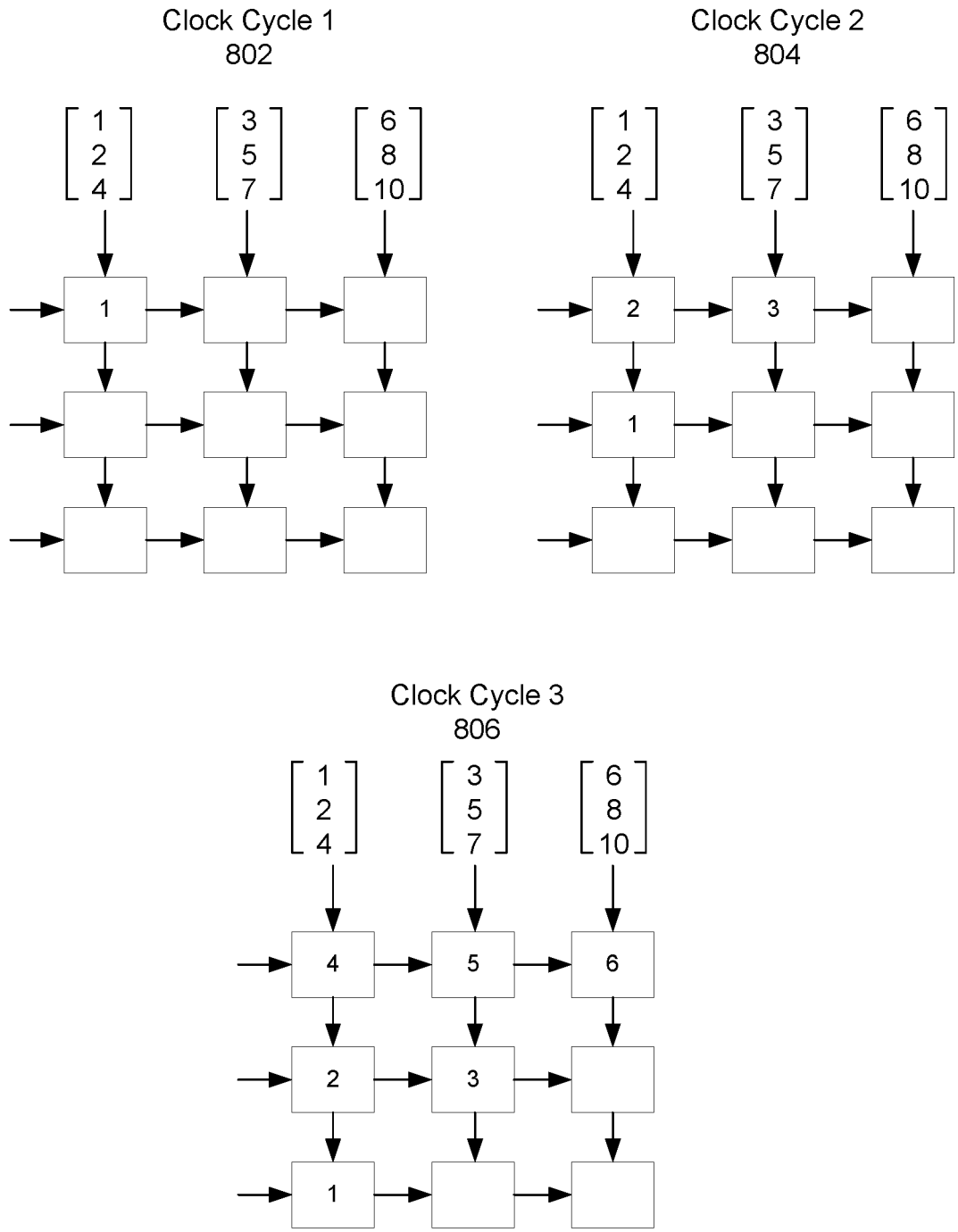
FIG. 8 shows an example illustration of weight inputs inside cells after three clock cycles.

FIG. 8 shows an example illustration 800 of weight inputs inside cells of an example 3×3 systolic array after three clock cycles. Each cell can store a weight input and an activation input, as described above in reference to FIG. 5. Weight inputs can be sent to cells at distinct columns of the systolic array for convolution calculations, as described above in reference to FIG. 7. By way of illustration, the system sends a first kernel matrix structure having weight inputs of 1, 2, and 4 to a first column of the systolic array. The system sends a second kernel structure having weight inputs of 3, 5, and 7 to a second column. The system sends a third kernel structure having weights 6, 8, and 10 to a third column. After every clock cycle, weight inputs can be shifted in one dimension, e.g., from top to bottom, while activation inputs can be shifted (not illustrated) in another dimension, e.g., from left to right.

Weight inputs can be stored within cells in a staggered manner. That is, a state of the systolic array after a first clock cycle 802 shows a '1' inside a top-left cell. The '1' represents the weight input of '1' stored in the cell. At the next clock cycle 804, the '1' is shifted to a cell under the top-left cell, and another weight input from the kernel, '2', is stored in the top-left cell as well as a weight input of '3' at a top-most cell at a second column.

On a third clock cycle, 806, each weight is shifted again. In the first column, a bottom-most cell stores the '1' weight input, the '2' weight input is stored where the '1' weight input was stored on the previous cycle, and a '4' weight input is stored in the top-left most cell. Similarly, in the second column, the '3' is shifted down and a '5' weight input is stored in the top-middle cell. In the third column, a '6' weight input is stored in the top-right most cell.

In some implementations, a control signal for the weight inputs that determines whether the weight inputs should be shifted is also shifted along with the weight inputs.

Activation inputs can be shifted in a similar fashion in the other dimension, e.g., from left to right.

Once the activation inputs and the weight inputs are in place, the processor can perform a convolution calculation, e.g., by using the multiplication and summation circuitries within the cells, to generate a set of accumulated values to be used in a vector computation unit.

Although the system has been described with weight inputs being sent to columns of the array and activation inputs being sent to rows of the array, in some implementations, the weight inputs are sent to rows of the array and the activation inputs are sent to columns of the array.

In some implementations, a neural network model has a stride parameter greater than one. The processor can perform computations with the stride parameter by converting matrix structures of activation input and weight inputs to respective permuted matrix structures having a larger feature dimension and smaller spatial dimensions.

In some implementations, when processing images, the processor permutes, i.e., remaps, the activation matrix structure to have the following size: CEIL(X/X_stride)×CEIL(Y/

Y_stride)×(Sizeof(RGB)*X_stride*Y_stride), where X and Y are the size of the matrix structure dimensions, X_stride and Y_stride are the stride parameters, and Sizeof(RGB) is three. The kernel matrix structure can also be permuted using the same formula. For example, if the stride parameter is 2×2, the activation matrix structure is originally 170× 170×3 and the kernel matrix structure is 7×7×3, the permuted activation matrix structure can be 85×85×12 and the permuted kernel matrix structure can be 4×4×12.

The coordinates of the activation and kernel matrix structures can be mapped to permuted coordinates using the following formula: [CEIL(X/2), CEIL(Y/2), Z+3*(X % 2)+6*(Y % 2)], where X, Y, and Z represent a coordinate in the respective matrix structure. Other formulas can include [CEIL(X/2), CEIL(Y/2), Z+3*(Y % 2)+6*(X % 2)] or [CEIL(X/2), CEIL(Y/2), 2*Z+(X % 2)+6*(Y % 2)].

Figure 9:
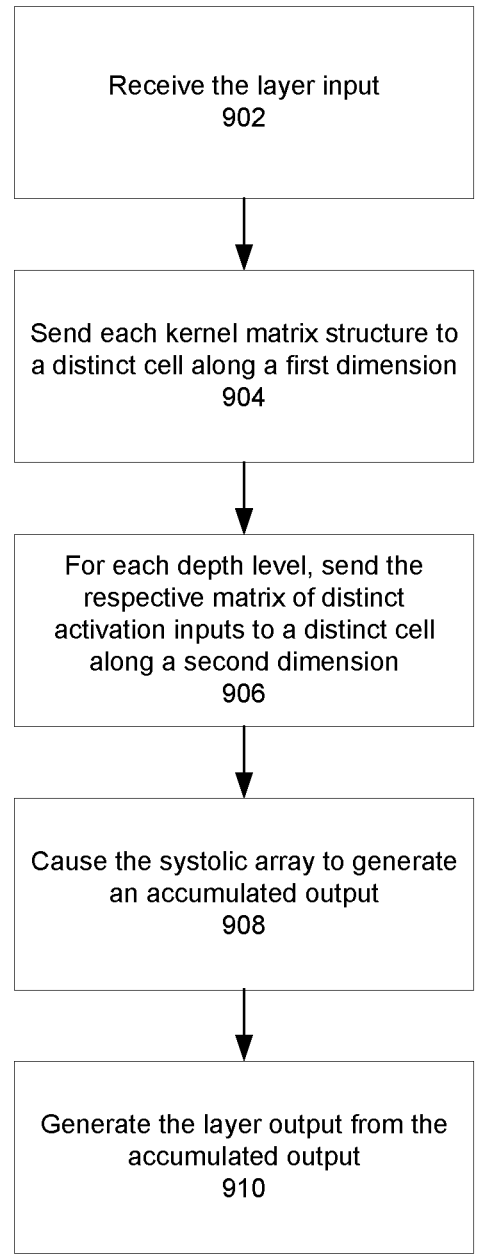
FIG. 9 is a flow diagram of an example method for computing a layer output for a convolutional neural network layer.

FIG. 9 is a flow diagram of an example method for computing a layer output for a convolutional neural network layer. For convenience, the method 900 will be described with respect to a system having one or more circuits that performs the method 900, e.g., the circuit 300 of FIG. 3. The process 900 can be performed for each convolutional layer of the neural network in order to compute an inference from a received input.

As described above, a convolutional neural network layer can have a set of kernels, and each kernel can be represented as a matrix structure of weights.

The system can receive a layer input, e.g., data from an image, (step 902). The layer input can be represented as a multi-dimensional matrix having multiple depth levels, as described above in matrix structure 600 of FIG. 6.

The system can send each kernel matrix structure to a distinct cell along a first dimension of a systolic array within the system (step 904). In some implementations, cells along the first dimension are cells located along columns of the array. For example, a given kernel matrix structure can be converted to a vector of elements, and each element can be shifted through a column of the systolic array as described above in reference to FIG. 8.

The system can, for each depth level, send the respective matrix of distinct activation inputs to a distinct cell along a second dimension of the systolic array (step 906). This is described above in reference to FIG. 7. In some implementations, the distinct cells along the second dimension are cells located along rows of the array. Activation inputs at a particular depth level can be converted into a vector of elements, and each element can be shifted through a row of the systolic array as described above in reference to FIG. 8.

The system can cause the systolic array to generate an accumulated output from the respective matrices sent to the cells (step 908), as described above in reference to FIG. 4.

The system can generate the layer output from the accumulated output (step 910), as described above in reference to FIGS. 3-4.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for generating an output for a layer of a neural network implemented on a hardware circuit, the method comprising:
   receiving for the layer of the neural network:
   layer inputs represented as a first multi-dimensional input matrix; and
   a plurality of weights;
   determining that computations to generate the output for the layer are convolutional computations;
   converting, based on a dimension of the first multi-dimensional input matrix, the convolutional computations to two-dimensional matrix multiplications between the layer inputs and the plurality of weights, the converting comprising flattening the first multi-dimensional input matrix into a plurality of second multi-dimensional input matrices, independently shifting each of the second multi-dimensional input matrices between cells of the hardware circuit, and performing a convolution computation on the plurality of second multi-dimensional input matrices; and
   generating the output in response to performing a portion of the two-dimensional matrix multiplications in parallel at the hardware circuit.

2. The method of claim 1, wherein converting the convolutional computations to two-dimensional matrix multiplications comprises:
   generating the plurality of second multi-dimensional input matrices based on a feature dimension of the first multi-dimensional input matrix.

3. The method of claim 2, wherein generating the plurality of second multi-dimensional input matrices comprises:
   deriving each of the second second multi-dimensional input matrices from the first multi-dimensional input matrix based on a depth level of the feature dimension.

4. The method of claim 2, wherein generating the plurality of second multi-dimensional input matrices comprises:
   generating each of the second multi-dimensional input matrices in response to splitting up respective sets of inputs of the first multi-dimensional input matrix to form a respective two-dimensional matrix for each of the second multi-dimensional input matrices.

5. The method of claim 2, wherein generating the plurality of second multi-dimensional input matrices comprises:
   generating a respective second multi-dimensional input matrix for each depth level of a plurality of depth levels of the feature dimension of the first multi-dimensional input matrix.

6. The method of claim 2, wherein the plurality of weights are represented as multi-dimensional kernel matrices and the method comprises:
providing each of the second multi-dimensional input matrices to a distinct row of a hardware matrix unit located on the hardware circuit; and
providing each of the multi-dimensional kernel matrices along a column dimension of the hardware matrix unit.

7. The method of claim 6, wherein generating the output comprises:
generating a plurality of dot products in response to performing multiple two-dimensional matrix multiplications in parallel at the hardware circuit, each two-dimensional matrix multiplication being between a respective layer input of a second multi-dimensional input matrix and a respective weight input of a multi-dimensional kernel matrix.

8. The method of claim 6, wherein the hardware matrix unit is a two-dimensional systolic array comprising a row dimension and a column dimension.

9. The method of claim 8, wherein each of the multi-dimensional kernel matrices represents a set of weights for a convolutional neural network layer and the method further comprises:
determining that the convolutional neural network layer comprises fewer sets of weights than columns in the two-dimensional systolic array;
in response to determining that the convolutional neural network layer comprises fewer sets of weights than columns, replicating one or more matrix structures for the sets of weights; and
sending the replicated matrix structures to unused columns of the two-dimensional systolic array to generate the output.

10. A system for generating an output for a layer of a neural network implemented on a hardware circuit, the system comprising:
one or more processing devices; and
one or more non-transitory machine-readable storage devices for storing instructions that are executable by the one or more processing devices to cause performance of operations comprising:
receiving for the layer of the neural network:
layer inputs represented as a first multi-dimensional input matrix; and
a plurality of weights;
determining that computations to generate the output for the layer are convolutional computations;
converting, based on a dimension of the first multi-dimensional input matrix, the convolutional computations to two-dimensional matrix multiplications between the layer inputs and the plurality of weights, the converting comprising flattening the first multi-dimensional input matrix into a plurality of second multi-dimensional input matrices, independently shifting each of the second multi-dimensional input matrices between cells of the hardware circuit, and performing a convolution computation on the plurality of second multi-dimensional input matrices; and
generating the output in response to performing a portion of the two-dimensional matrix multiplications in parallel at the hardware circuit.

11. The system of claim 10, wherein converting the convolutional computations to two-dimensional matrix multiplications comprises:
generating the plurality of second multi-dimensional input matrices based on a feature dimension of the first multi-dimensional input matrix.

12. The system of claim 11, wherein generating the plurality of second multi-dimensional input matrices comprises:
deriving each of the second second multi-dimensional input matrices from the first multi-dimensional input matrix based on a depth level of the feature dimension.

13. The system of claim 11, wherein generating the plurality of second multi-dimensional input matrices comprises:
generating each of the second multi-dimensional input matrices in response to splitting up respective sets of inputs of the first multi-dimensional input matrix to form a respective two-dimensional matrix for each of the second multi-dimensional input matrices.

14. The system of claim 11, wherein generating the plurality of second multi-dimensional input matrices comprises:
generating a respective second multi-dimensional input matrix for each depth level of a plurality of depth levels of the feature dimension of the first multi-dimensional input matrix.

15. The system of claim 11, wherein the plurality of weights are represented as multi-dimensional kernel matrices and the operations comprise:
providing each of the second multi-dimensional input matrices to a distinct row of a hardware matrix unit located on the hardware circuit; and
providing each of the multi-dimensional kernel matrices along a column dimension of the hardware matrix unit.

16. The system of claim 15, wherein generating the output comprises:
generating a plurality of dot products in response to performing multiple two-dimensional matrix multiplications in parallel at the hardware circuit, each two-dimensional matrix multiplication being between a respective layer input of a second multi-dimensional input matrix and a respective weight input of a multi-dimensional kernel matrix.

17. The system of claim 15, wherein the hardware matrix unit is a two-dimensional systolic array comprising a row dimension and a column dimension.

18. The system of claim 17, wherein each of the multi-dimensional kernel matrices represents a set of weights for a convolutional neural network layer and the operations further comprise:
determining that the convolutional neural network layer comprises fewer sets of weights than columns in the two-dimensional systolic array;
in response to determining that the convolutional neural network layer comprises fewer sets of weights than columns, replicating one or more matrix structures for the sets of weights; and
sending the replicated matrix structures to unused columns of the two-dimensional systolic array to generate the output.

19. A non-transitory machine-readable storage device for storing instructions that are executable by a processing device to cause performance of operations to generate an output for a layer of a neural network implemented on a hardware circuit, the operations comprising:
receiving for the layer of the neural network:
layer inputs represented as a first multi-dimensional input matrix; and a plurality of weights;

determining that computations to generate the output for the layer are convolutional computations;

converting, based on a dimension of the first multi-dimensional input matrix, the convolutional computations to two-dimensional matrix multiplications between the layer inputs and the plurality of weights, the converting comprising flattening the first multi-dimensional input matrix into a plurality of second multi-dimensional input matrices, independently shifting each of the second multi-dimensional input matrices between cells of the hardware circuit, and performing a convolution computation on the plurality of second multi-dimensional input matricesflattened matrix; and generating the output in response to performing a portion of the two-dimensional matrix multiplications in parallel at the hardware circuit.

20. The machine-readable storage devices of claim 19, wherein converting the convolutional computations to two-dimensional matrix multiplications comprises:

generating the plurality of second multi-dimensional input matrices based on a feature dimension of the first multi-dimensional input matrix.

* * * * *